United States Patent
Strahm et al.

(10) Patent No.: US 9,848,628 B1
(45) Date of Patent: Dec. 26, 2017

(54) PRODUCT DRYING APPARATUS AND METHODS

(71) Applicant: Wenger Manufacturing, Inc., Sabetha, KS (US)

(72) Inventors: Adrian L. Strahm, Sabetha, KS (US); Keith A. Erdley, Hiawatha, KS (US); Scott E. VanDalsem, Fairview, KS (US); Adam S. Hinton, Hiawatha, KS (US); Douglas S. Clark, Sabetha, KS (US)

(73) Assignee: Wenger Manufacturing, Inc., Sabetha, KS (US)

( * ) Notice: Subject to any disclaimer, the term of this patent is extended or adjusted under 35 U.S.C. 154(b) by 0 days.

(21) Appl. No.: 15/437,658

(22) Filed: Feb. 21, 2017

Related U.S. Application Data

(60) Provisional application No. 62/437,124, filed on Dec. 21, 2016.

(51) Int. Cl.
| | |
|---|---|
| *F26B 21/00* | (2006.01) |
| *A23L 3/40* | (2006.01) |
| *F26B 15/14* | (2006.01) |
| *F26B 21/12* | (2006.01) |

(52) U.S. Cl.
CPC ............... *A23L 3/40* (2013.01); *F26B 15/14* (2013.01); *F26B 21/12* (2013.01); *A23V 2002/00* (2013.01)

(58) Field of Classification Search
CPC . F26B 15/14; F26B 21/12; A23L 3/40; A23V 2002/00
See application file for complete search history.

(56) References Cited

U.S. PATENT DOCUMENTS

| | | | |
|---|---|---|---|
| 4,221,058 A | 9/1980 | Zagorzycki | |
| 5,051,267 A | 9/1991 | Handl et al. | |
| 5,425,959 A | 6/1995 | Manser | |
| 5,595,000 A * | 1/1997 | Goodwin, III | ........ F26B 21/086 34/212 |
| 5,980,962 A | 11/1999 | Bracken et al. | |
| 6,095,908 A | 8/2000 | Torii | |
| 6,223,451 B1 | 5/2001 | Satake et al. | |
| 6,297,479 B1 | 10/2001 | Wefers | |
| 6,408,539 B1 | 6/2002 | Voth et al. | |
| 7,194,822 B2 | 3/2007 | Kolari | |
| 8,707,861 B2 | 4/2014 | Gunawardena et al. | |

(Continued)

FOREIGN PATENT DOCUMENTS

| | | |
|---|---|---|
| CN | 204007025 U | 12/2014 |
| CN | 204923774 U | 12/2015 |

(Continued)

*Primary Examiner* — Jessica Yuen
(74) *Attorney, Agent, or Firm* — Hovey Williams LLP

(57) ABSTRACT

The present invention provides improved apparatus and methods for the monitoring and control of apparatus designed to remove moisture from an initially wet product, such as a continuous dryer (14). The net rate of water removal from the wet product (16) is determined during drying thereof, preferably on a real-time basis. A control assembly (20) is operatively coupled with the dryer (14) and includes sensors (24, 26, 28, 34), which are operatively coupled with a digital controller (38). The controller (38) has a PID controller operable to continuously determine the average net rate of water removal from the product (16).

19 Claims, 4 Drawing Sheets

(56) References Cited

U.S. PATENT DOCUMENTS

| | | |
|---|---|---|
| 8,834,764 B2 | 9/2014 | Schmidt et al. |
| 9,357,787 B2 | 6/2016 | Deming et al. |
| 2014/0193548 A1 | 7/2014 | Godoy Varo |
| 2015/0354895 A1 | 12/2015 | Bloemendaal et al. |

FOREIGN PATENT DOCUMENTS

| | | |
|---|---|---|
| CN | 205671411 U | 11/2016 |
| CN | 205690830 U | 11/2016 |
| KR | 101118671 B1 | 3/2012 |
| WO | 2005089947 A2 | 9/2005 |

\* cited by examiner

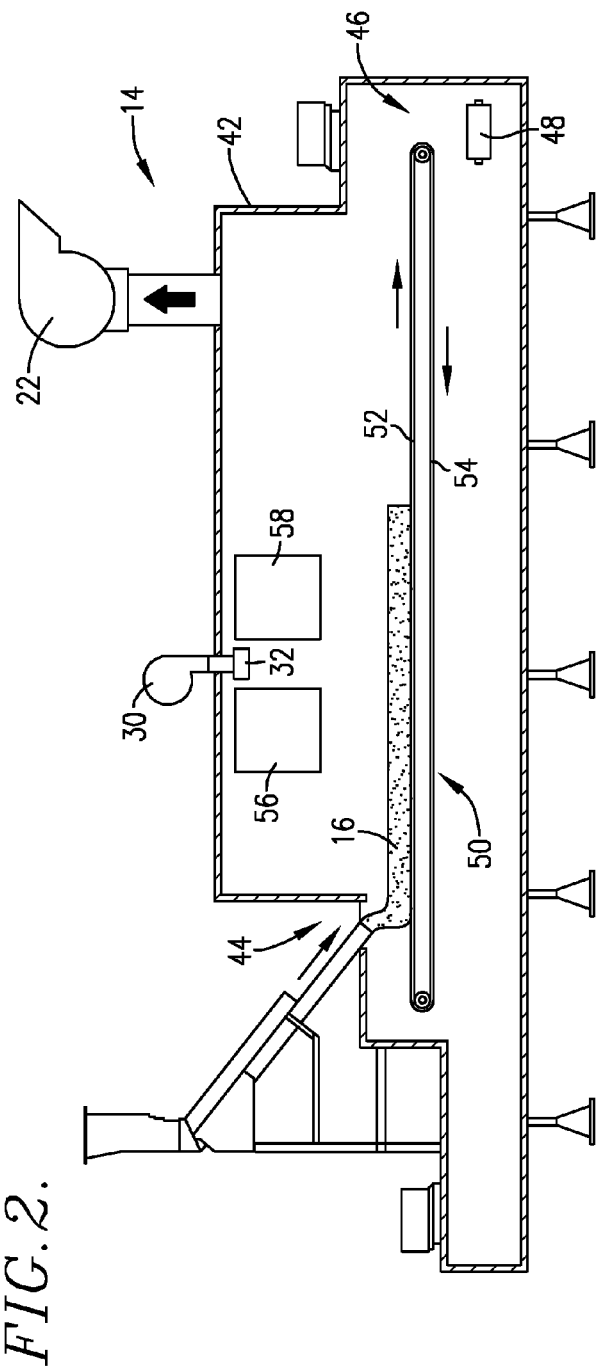
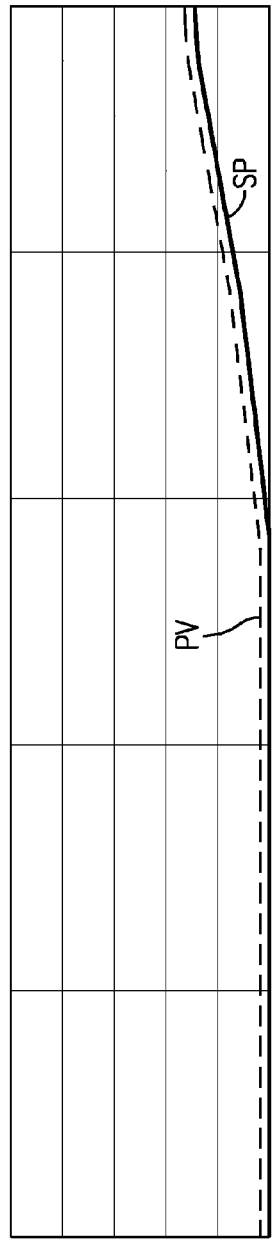

PRODUCT DRYING APPARATUS AND METHODS

CROSS-REFERENCE TO RELATED APPLICATION

This application claims the benefit of U.S. Provisional Patent Application Ser. 62/437,124 filed Dec. 21, 2016, entitled METHOD OF CONTROLLING PRODUCT DRYING APPARATUS TO PROVIDE THE NET RATE OF WATER REMOVAL FROM A PRODUCT IN REAL TIME. The provisional application is incorporated herein in its entirety.

BACKGROUND OF THE INVENTION

Field of the Invention

The present invention is broadly concerned with methods and apparatus for the operational monitoring and control of apparatus capable of removing water from products passing therethrough, such as dryers or coolers of the type commonly used in food or feed manufacture. More particularly, the invention provides methods and apparatus permitting determination of the net rate of water removal from products during operation of said apparatus, preferably on a real time basis.

Description of the Prior Art

During the production of certain comestible products, such as animal feeds or human foods, an initially dry formula typically containing protein, starch, and fats is first processed using an extruder or other cooking device to create a continuous stream of cooked product. The output from the extruder is normally too wet for packaging or storage (e.g., from about 20-40% by weight moisture), and thus must be dried. A dryer is positioned to receive the continuous stream of cooked, wet product, and to dry the product to a desired moisture level, such as 8-12% by weight moisture.

A variety of dryers have been used in the past in these contexts, such as single or multiple pass horizontal dryers, or vertical dryers. Horizontal dryers of this type include a dryer housing with one or more internal conveyors leading from a wet product inlet to a dried product outlet. Similarly, vertical dryers have a series of stacked decks where product is initially processed in the uppermost deck and is then passed in serial order to the lower decks, leaving to a dried product outlet. In either case, ambient air is drawn into the dryer body and heated, either directly or indirectly, and is then circulated for contact with the product within the dryer body. In many instances, a cooler section is used with product dryers, in order to cool the product for downstream handling or packaging; such coolers do not utilize heated air, but merely circulate air through the dried product to lower the temperature thereof.

A longstanding problem with such equipment is that it has been necessary to periodically take samples of the dryer output and physically measure the moisture content thereof. Only after such testing could the operation of the equipment be modified in an effort to produce acceptably dried products. Thus, in the context of dryers, during initial start-up of the dryers, or in the event of dryer upset, 20 minutes or more may elapse before an initial moisture reading can be taken and analyzed in a laboratory. Only then can the dryer operation be modified, which then entails a further wait until another sample can be taken and measured for moisture content. As a consequence, a considerable amount of waste product is generated until it is determined that the dryer is operating as required to produce dry product within specifications. Thus, the conventional practice of repeated sampling and testing is inefficient in terms of time and costly in terms of waste product, which has little value or utility.

There is therefore a need in the art for improved dryers and other apparatus for water removal which can be controlled in such a way as to minimize or eliminate periodic sampling and laboratory moisture testing.

SUMMARY OF THE INVENTION

The present invention overcomes the problems outlined above, and provides methods for monitoring and controlling the operation of apparatus serving to remove water from a product via contact between the product and input air entering the apparatus, where such apparatus is also provided with an exhaust fan for moving moisture-laden exit air from the apparatus. The methods generally involve the determination of the net rate of water removal from the product during operation of the apparatus, preferably in real time.

In one aspect of the invention, such water removal determinations involve the initial determination of the volumetric flow rate of the air from the exhaust fan (usually measured as CFM ($f^3$/min) or $m^3$/min), and using this flow rate to determine the net rate of water removal from the product during operation of the apparatus. To this end, determinations are also made of the net rates of water entering the apparatus from both the initially wet product to be dried and the input air, and the rate of water removed from the apparatus as a part of the exit air.

A number of different techniques may be employed to determine the volumetric flow rate of the exit air from the fan. Most commonly these methods attempt to find air velocity and thereby volumetric flow rate. For example, measurements of air velocity (directly or indirectly), air velocity pressure and/or static air pressure induced by the fan may be made. These methods make use of pitot tubes, venturi, orifice plates, vortex shedders, hot wire anemometer, or vane anemometer placed within the fan ducting. However, the accuracy of such measurements may be compromised by the fact that the velocity of the exit air is not uniform throughout the cross-section of a duct, i.e., friction slows the air moving close to the duct walls, so that the velocity is greater in the center of the duct. In light of these considerations, the practice of the present invention preferably makes use of indirect methods whereby one or more operational parameters of the exhaust fan are sensed or otherwise determined, and these parameter(s) may then be used to calculate volumetric flow rate, such as through the well-known Fan Law equations. Such fan parameters include the rotational speed (rpm) of the fan, the motor power of the fan (i.e., the energy consumed by the fan motor to rotate the fan), fan pressure (either static, velocity, or total), or combinations thereof.

As noted, the methods of the invention determine and make available the net rate (usually the average net rate) of water removal from wet product passing through the apparatus, and preferably this net rate is determined in real time. As used herein, "real time" refers to the fact that the net rate of water removal is determined and available (e.g., through a visual display) during the time that the initially wet product is passing through the apparatus. Thus, as an amount of initially wet product is introduced into the apparatus and passes therethrough, the net rate of water removal from the amount of initially wet product is determined during the time of such passage.

Apparatus in accordance with the invention include all types of equipment designed to remove water from an initially wet product by contacting the product with input air to create dried product and moisture-laden exit air. For example, the apparatus may be in the form of a horizontal or vertical hot-air convection dryers, coolers, or any other suitable moisture removal equipment.

In preferred practice, the methods of the invention also include the step of adjusting at least one control parameter of the apparatus which will alter the rate of water removal from the product, in response to the determined net rate of water removal. In one implementation of the invention, apparatus control involves determining a set point rate SP which is the desired net rate of water removal from the product during passage thereof through the apparatus, determining a process variable PV which is the actual net rate of water exiting the product during passage through the apparatus, and determining a control variable CV. CV is an apparatus parameter serving to alter the rate of water removal from the product, such as the temperature of heated input air in the case of a dryer, the speed of product passing through the apparatus, the contact time between the product and the input air, and combinations thereof. Apparatus control is achieved by changing the CV as necessary to cause the PV to approach the SP, and ultimately to substantially equal the SP (e.g., within plus or minus 3%, preferably plus or minus 1%, of the SP). Typically, the SP, PV, and CV are successively and periodically determined, and the apparatus operation is controlled using such successive determinations.

Successive SP, PV, and CV determinations are usually carried out using a PID (proportional-integral-derivative) controller. For example, the PID controller may be operated so that, in each control loop, SP and PV are calculated, along with the difference between SP and PV; the control variable CV is then determined for driving the PV toward the SP. SP may be determined as the initial water rate (IWR) minus the final water rate (FWR), where IWR is the rate of water delivered to the apparatus as a part of the wet product input, and FWR is the desired rate of water exiting from the apparatus as a part of the dried product output. PV may be determined as the rate of water leaving the apparatus as a part of the output of the exhaust fan minus the rate of water entering the apparatus as a part of the input air.

In one embodiment, invention provides improved apparatus comprising a drying chamber having a wet product input and a dried product output, one or more input(s) for ambient air, and an output for moisture-laden exit air including a motor-powered exhaust fan. A sensor assembly is provided for determining the rotational speed of the exhaust fan and the power of the exhaust fan motor. The drying chamber also has apparatus for determining the wet bulb temperatures and dry bulb temperatures of the moisture-laden exit air and the input (usually ambient) air. A digital controller, such as the described PLC/PID controller, is operably coupled with the sensor assembly and the apparatus in order to control the operation of the apparatus.

As noted above, a variety of different dryers and/or coolers can be controlled using the invention. For example, the dryer may employ different devices for heating ambient-derived input air, such as an open-flame heater or firebox, or steam coils for indirect heating of the air. Recirculation fans are normally provided for circulating the heated air between the heating device and the product being dried. Moreover, the exhaust fans of the invention may be of any suitable type, such as conventional rotary blade fans or blowers.

The improved drying methods and apparatus of the invention may form a part of an overall system for the production of products, such as food or feed products containing amounts of protein (grain- or animal-derived or both), starch, fats, vitamins, minerals, and other additives. These products are typically formulated as raw mixtures and are processed to cook the mixtures in order to denature the protein and gelatinize the starch. Pet feeds, fish feeds, and certain human foods are of this character. Systems of this type include an upstream processing assembly and a downstream dryer. The upstream components may be conventional single or twin screw extruders, or pellet mills, which feed a continuous stream of wet product to the downstream dryer, which is a dryer in accordance with the convention. In other contexts, the invention can be used for the control of dryers for fruits, vegetables, nuts, or other processed foods. In these instances, different upstream processing or handling equipment is used.

BRIEF DESCRIPTION OF THE DRAWINGS

FIG. 2 is a schematic view in vertical section of a product dryer in accordance with the invention, shown during initial loading of the dryer with wet product;

FIG. 3 is a graph illustrating the operation of the dryer of FIG. 2 during initial loading thereof with wet product, depicting the buildup of SP and PV values, but without operation of a control variable;

DETAILED DESCRIPTION OF THE PREFERRED EMBODIMENTS

Figure 1:
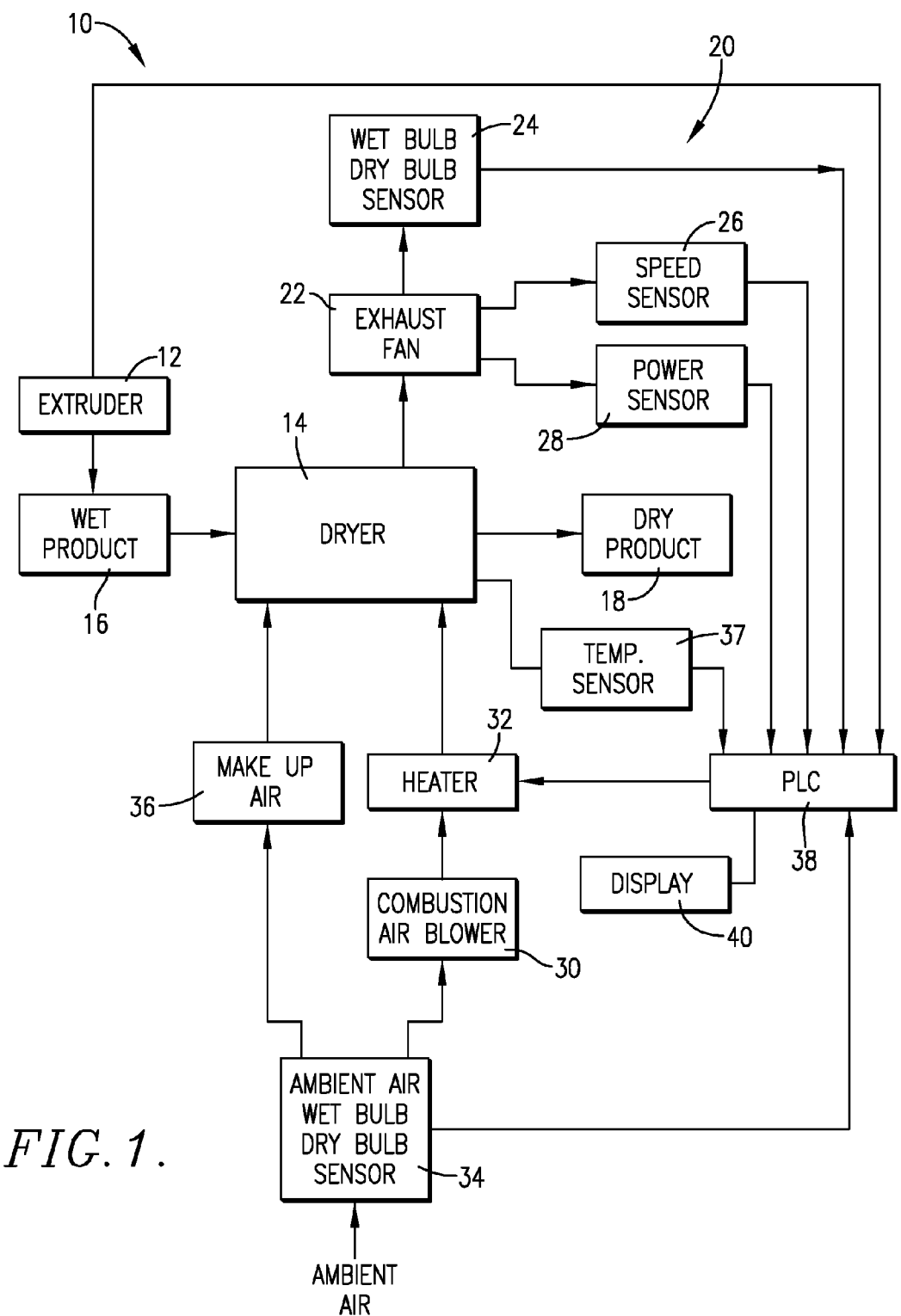
FIG. 1 is a schematic block diagram illustrating the components of an extruder/dryer system in accordance with the invention used for the production of food or feed products.

The following Example illustrates an implementation of the present invention in the context of a horizontal, fuel-fired convection dryer. It should be understood, however, that this Example is provided by way of illustration only, and nothing therein should be taken as a limitation on the overall scope of the invention.

EXAMPLE

The following hypothetical, computer-generated example illustrates an implementation of the present invention during the operation of an extrusion system 10 for the production of human foods or animal feeds. The system 10 broadly includes extruder 12 and a single-pass, fuel-fired convection dryer 14. The extruder is itself conventional, and is operable to produce a continuous stream of wet, cooked product 16, which is processed in dryer 14 to yield a dry product 18. A control assembly 20 is provided for the dryer 14 in order to determine, on a real-time basis, the net rate of water leaving the wet product 16 during passage thereof through the dryer.

The control assembly 20 includes an exhaust fan 22 coupled with dryer 14, and a wet bulb/dry bulb sensor 24 designed to measure the wet and dry bulb temperatures of the output of fan 22. Additionally, the fan 22 is equipped with an rpm speed sensor 26 and a fan motor power sensor 28. The dryer 14 is further equipped with a combustion air blower 30, which delivers air to a fuel-fired air heater 32, so that the heated air is delivered to the interior of dryer 14. An ambient air wet bulb/dry bulb sensor 34 is provided to determine the wet and dry bulb temperature of the input air, including the air fed to blower 30, and the make-up air 36 passing into the dryer 14 as air is exhausted via fan 22. A temperature sensor 37 is also operatively situated in dryer 14 for sensing the internal temperature thereof.

A programmable logic controller (PLC) 38 controls the operation of assembly 20 using inputs from the wet bulb/dry bulb sensors 24, 34, the fan speed and power sensors 26, 28, and the controller for extruder 12. The PLC 38 output controls the operation of heater 32 by adjusting the flow of fuel thereto. Additionally, a display 40 is operably coupled with PLC 38 so that the net rate of water leaving the wet product 16, and other control information, may be visually displayed to the operator of system 10.

Figure 4:
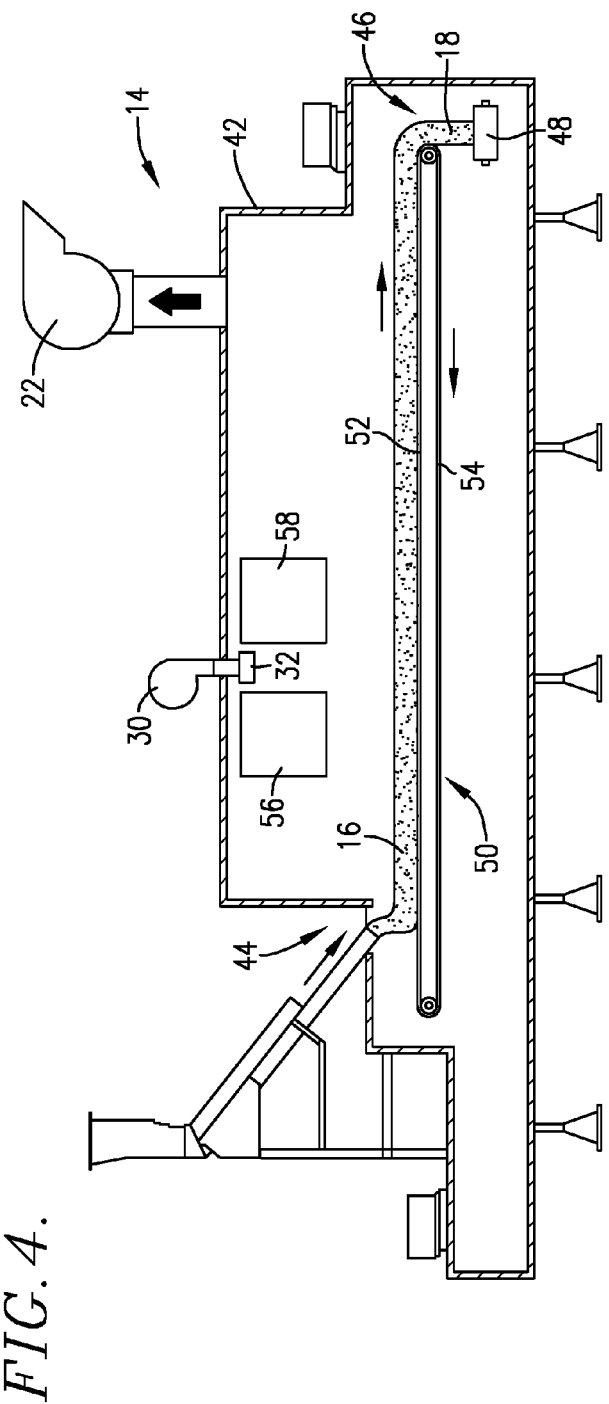
FIG. 4 is a schematic view similar to that of FIG. 2, but illustrating the dryer after full loading thereof with product.

The dryer 14 is schematically illustrated in FIGS. 2 and 4, and includes an elongated dryer cabinet or housing 42 having an inlet 44 for wet product 16, and an outlet 46 for delivery of dry product 18 to a take-away conveyor 48 or similar device. Internally, the dryer 14 includes a shiftable conveyor 50 presenting upper and lower runs 52, 54, and which is conventionally powered in order to continuously move the wet product 16 along the length of the dryer between inlet 44 and outlet 46. The flow of wet product 16 is directed onto the upper run 52 of conveyor 50. This incoming flow of wet product 16 has a determined Wet Rate, which is the total amount of product (both solids and native and added water) making up the wet product as it issues from the extruder 12. Additionally, the % H2O of the wet product 16 is known, i.e., the total % moisture of the wet product, based upon the total weight of the wet product taken as 100% by weight. This data is determined and stored within the extruder controller.

As illustrated, the dryer 14 also includes a combustion air blower 30 and an associated heater unit 32, typically in the form of an open-flame firebox. Further, the dryer has exhaust fan 22, which exhausts moisture-laden exit air from the cabinet 42 during operation. Make-up air 36 passes through the inlet 44 or any other suitable location. A series of recirculation fans 56, 58 recirculate the hot air within the dryer cabinet 42 during the course of the drying process. The exhaust fan 22 has known operating parameters or ratings, which are typically derived from the fan manufacturer, or can be independently determined. The fan 22 in this example has an operating volume of 16,000 ft$^3$/min when operating under the following conditions: a rotational speed of 1201 rpm, a pressure (wg) of 12 (FSP), power of 44.8 BHP, and air density factor of 0.0598 lb/ft$^3$. The reference data was taken from a fan situated at an altitude of 1050 ft above sea level.

The dryer control process is implemented in PLC 38 by use of a PID loop. The PID loop requires a SP (set point), a PV (process variable), and it yields a CV (control variable). Successive calculations of SP and PV are fed into a PID loop to control the average net rate of water leaving the product 16 as it passes through dryer 14. The SP is the desired rate of water removal from the product 16 to achieve the desired moisture level in the dry product 18. The PV is the net rate of water leaving the product 16 during passage through dryer 14. The CV is the temperature within dryer 12, which is controlled by adjusting the fuel input to heater unit 32.

In practice, the calculations are performed essentially continuously, typically every 20 milliseconds. However, given the relatively slow response time of dryer 14, it is not necessary that each of these calculations be used in the control algorithm. Rather, the conveyor 50 is divided into a series of N data elements, here 100 of such elements. The data interval is based upon the rate of travel and length of the conveyor 50. Calculations are fed to the data series at equal intervals of time to represent each data element. Accordingly, each data element represents the desired rate of water removal from the product 16 over a corresponding $\frac{1}{100}$ of the length of conveyor 50. As each data element is calculated by the PLC 38, it is stored in memory and all 100 of the data elements, including those containing zero during dryer start-up, are averaged to obtain the average desired rate of water removal from the dryer 14. Each of the data elements is successively updated, and all the stored data elements are averaged continuously. This provides a moving average of the desired rate of water removal from the product 16 passing through the dryer 14.

The PID loop is initially tuned, which involves the process of selecting the values of proportional, integral, and derivative gains of the controller to achieve the desired dryer performance. The selected values are chosen by considering a number of factors, including the type and size of the dryer, the anticipated drying rate, and the type of product to be processed. Such tuning is well within the skill of the art.

SP, PV, and CV are calculated and used in PLC 38 as follows.

Calculation of the Set Point SP

In order to calculate SP, the PLC 38 needs the following information:

Wet Rate (WR)=the total rate of material (solids plus water, both native and added) delivered to the dryer 14 as it issues from the extruder 12, in kg/hr;

% H2O=the total moisture content of the wet product 16 issuing from the extruder 12, in %;

Dry Rate (DR)=the total rate of bone dry material delivered to the dryer 14 as a part of the wet product 16 issuing from the extruder 12, in kg/hr;

Initial Water Rate (IWR)=the rate of water delivered to the dryer 14 as a part of the wet product 16 issuing from the extruder 12, in kg/hr;

Final Water Rate (FWR)=is the desired rate of water delivered from the dryer 14 as a part of the dry product 18, in kg/hr;

Actual Water Rate (AWR)=the actual rate of water delivered from the dryer 14 as a part of the dry product 18, in kg/hr;

Target Dry Moisture Content (TargetDMC)=is the desired moisture content of the dry product 18, in %.

The WR, % H2O, and AWR are values derived from the operation of extruder 12 and are delivered to PLC 38 as illustrated in FIG. 1. The TargetDMC is a preselected value for the dry product 18. The remaining values are calculated as follows.

$$IWR(kg/hr)=WR(kg/hr)*\% \text{ H2O}(\%)/100;$$

$$DR(kg/hr)=WR(kg/hr)-IWR(kg/hr);$$

$$FWR(kg/hr)=DR(kg/hr)/(1-TargetDMC(\%)/100)-DR(kg/hr).$$

The final SP calculation is:

$$SP(kg/hr)=IWR(kg/hr)-FWR(kg/hr).$$

Calculation of the Process Variable PV

PV=net rate of water removed from the wet product 16 during passage through dryer 14, in lb/hr, and is equal to (A) the rate of water leaving the dryer 14 as a part of the output of exhaust fan 18, minus (B) the rate of water entering the dryer 14 as a part of the output of combustion air blower 30, and minus (C) the rate of water entering the dryer 14 as a part of the make-up air. Therefore, in order to calculate PV, the above three different values A, B, and C must be determined.

Determination of A=the Rate of Water Leaving the Dryer 14 as Part of the Output of Exhaust Fan 22

This calculation includes the determination of the volumetric rate of flow of moisture-laden air from the exhaust fan 22, typically as CFM or f³/min. This determination is preferably carried out using an appropriate Fan Law, which in turn requires sensing of appropriate fan parameters. Such Fan Laws are described in *Fan Engineering*, 6th Edition (1961), edited by Robert Jorgensen, pp. 226-227. This reference teaches a number of ways of calculating fan CFMs, using different fan parameters. For example, Fan Law 10b calculates exhaust fan CFM using sensed fan horsepower and fan rpm; Fan Law 7b calculates CFM using fan air pressure (which may be static, velocity, or total air pressure; as used herein, "fan pressure" refers to any of the foregoing) and fan rpm; and Fan Law 9c calculates CFM using fan motor power and fan pressure. In principle, any of the CFM Fan Law equations could be employed, but from a practical point of view, 10b, 7b, and 9c are the most useful. Therefore, in preferred forms, two operational parameters of the fan are employed, selected from the group consisting of: (1) fan motor power and fan rotational speed; (2) fan pressure and fan rotational speed; or (3) fan motor power and fan pressure.

For ease of reference, the preferred Fan Law equations are set forth below:

$$CFM_a = CFM_b \times (HP_a/HP_b)^{3/5} \times (RPM_b/RPM_a)^{4/5} \times (\delta_b/\delta_a)^{3/5} \quad \text{10b:}$$

$$CFM_a = CFM_b \times (PRESS_a/PRESS_b)^{3/2} \times (RPM_b/RPM_a)^2 \times (\delta_b/\delta_a)^{3/2} \quad \text{7b:}$$

$$CFM_a = CFM_b \times (HP_a/HP_b)^1 \times (PRESS_b/PRESS_a)^1 \times (1) \quad \text{9c:}$$

where: $CFM_a$ is the actual volumetric air flow of exhaust fan output, in f³/min; $CFM_b$ is the fan manufacturer reference volumetric air flow of the exhaust fan output, in f³/min; $HP_a$ is the actual horsepower utilized by the fan motor, in BHP; $HP_b$ is the fan manufacturer reference horsepower utilized by the fan motor, in BHP; $RPM_a$ is the actual rotational speed of the exhaust fan, in rpm; $RPM_b$ is the fan manufacturer reference rotational speed of the exhaust fan, in rpm; $\delta_a$ is the actual air density of the exhaust fan output, in lbs/f³; $\delta_b$ is the fan manufacturer reference air density of the exhaust fan output, in lbs/f³; $PRESS_a$ is the actual fan pressure of the exhaust fan; and $PRESS_b$ is the fan manufacturer reference pressure of the exhaust fan.

In order to determine the value A using Fan Law equation 10b, the PLC needs the following information:

mfT(R)=dry bulb temperature of the exhaust fan output in Rankine;
mfTS(R)=wet bulb temperature of the exhaust fan output in Rankine;
gfExtnAmbAlt=Dryer elevation (ft);
mfW=Absolute Humidity=lb water vapor/lb dry air in the exhaust fan output;
mfWS=Saturated Absolute Humidity in the exhaust fan output=lb water vapor/lb dry air in the exhaust fan output;
mfAP=atmospheric pressure of the exhaust fan output, in lb/in2;
mfPS=Saturation Pressure of the exhaust fan output, in lb/in2;
mfV=specific volume of the exhaust fan output, in ft³/lb;
CFMa=actual air flow of the exhaust fan output, in ft³/min;
CFMb=fan manufacturer-reference air flow of the exhaust fan output, in ft³/min;
HPa=actual horsepower of the fan motor, in BHP;
HPb=fan manufacturer reference horsepower of the fan motor, in BHP;
RPMa=actual rotational speed of the exhaust fan, in rpm;
RPMb=fan manufacturer reference rotational speed of the exhaust fan, in rpm;
AirDensitya=actual air density of the exhaust fan output;
AirDensityb=fan manufacturer reference air density of the exhaust fan output.

The mfT(R) and the mfTS(R) values are derived from the sensor 24. The gfExtnAmbAlt is the system elevation. The HPb, RPMb, and AirDensityb are provided by the fan manufacturer. The remaining values are calculated as follows.

$$mfPS = e(((14.61*mfTS(R))-8208.44)/(mfTS(R)-72.60))$$

$$mfWS = (0.6244*mfPS(lb/in^2))/(mfAP(lb/in^2)-mfPS(lb/in^2))$$

$$mfW = mfWS-((0.26*(mfT(R)-mfTS(R)))/(1359.0-(0.576*mfTS(R))))$$

$$mfAP(lb/in^2) = 14.696(lb/in^2)*(0.01367*(gfExtnAmbAlt(ft)/1000(ft/inHg))^2 - 1.0744*(gfExtnAmbAlt(ft)/1000(ft/inHg))+29.92(inHg))/29.92(inHg)$$

$$mfV(ft^3/lb) = (mfT(R)/mfAP(lb/in^2)*(0.3779(ft^3/R*in^2)+0.5909(ft^3/R*in^2)*mfW(lb/lb))$$

$$AirDensitya(lb/ft^3) = (1+mfWS(lb/lb))/mfV(ft^3/lb)$$

Using Fan Law 10b from the previously mentioned Fan Engineering handbook:

$$CFMa = CFMb*(HPa/HPb)^{(3/5)}*(RPMb/RPMa)^{(4/5)}*(AirDensityb/AirDensitya)^{(3/5)}.$$

The value A is calculated as follows:

A=the rate of water leaving the dryer 14 in lb/hr=CFMa(ft³/min)*AirDensitya(lb/ft³)*mfW*(lb/lb)*60(min/hr).

Determination of B=the Rate of Water Entering Dryer 14 as a Part of the Combustion Air of Blower 30

The combustion blower 30 has a fixed fan speed with a known CFM output. Therefore, the value B is calculated as follows:

B=the rate of water entering dryer 14 as a part of the combustion air of blower 30 in lb/hr=CFM of combustion blower 30(ft³/min)*ambient AirDensitya(lb/ft³)*ambient mfW(lb/lb)*60 (min/hr).

Determination of C=the Rate of Water Entering the Dryer 14 as a Part of the Make-Up Air The CFM of Dryer Make-up Air (ft³/min)=CFMa (ft³/min)−CFM of combustion blower 30 (ft³/min). The value C is calculated as follows:

C=the rate of water entering dryer 14 as part of the make-up air in lb/hr=CFM of Dryer Make-up Air(ft³/min)*ambient AirDensitya(lb/ft³)*ambient mfW(lb/lb)*60(min/hr).

The final calculation of PV is:

PV=A−B−C

Determination of the Control Variable CV

CV is used to control PV. In this implementation, CV=Dryer temperature.

CV=Dryer Temperature(° F.)

FIG. 2 illustrates the system 10 during start-up as product is being issued from extruder 12 onto conveyor run 52, and FIG. 3 depicts the displayed output from dryer control assembly 20. It is to be understood that the dryer 14 is typically preheated to a selected temperature before actual drying operations commence. Accordingly, during the initial fill stage, the heater 32 will not operate, because drying is effected owing to the preheat of the dryer. However, as the process proceeds, the PV and SP lines moves upwardly and the heater 32 begins to operate. Also as shown in FIG. 3, the PV curve is initially above the SP curve, meaning that more water is being removed than is needed.

Figure 5:
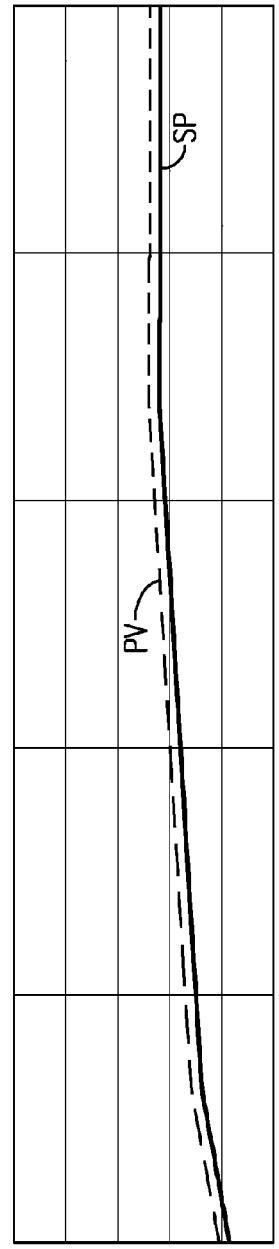
FIG. 5 is a graph similar to FIG. 3 illustrating the operation of the dryer of FIG. 4 after full loading of the dryer, depicting the further buildup of SP and PV values, but without operation of a control variable.
Figure 6:
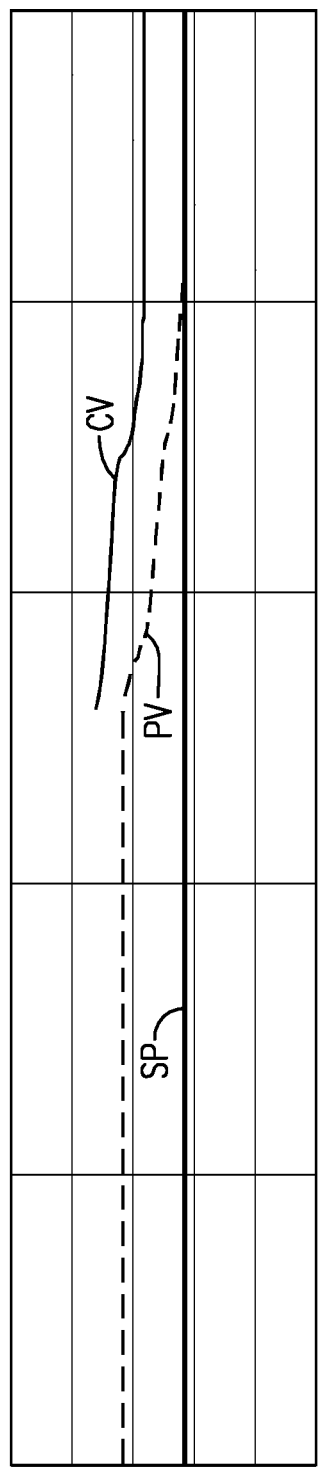
FIG. 6 is a graph similar to FIG. 5 illustrating the further operation of the dryer of FIG. 4, depicting the calculated SP and PV values without operation of a control variable, and initiation of the operation of a control variable CV, serving to drive PV towards SP until PV is at least approximately equal to SP.

FIGS. 4 and 5 illustrate the system 10 once the dryer conveyor 50 is fully loaded. At this point, the extruder 12 is running at a constant rate and the PV and SP lines are becoming straight. Again, however, the dryer is in an "over-dry" condition. FIG. 6 illustrates further progress of the dryer operations, again initially in an over dry condition. However, towards the center of FIG. 6, it will be observed that the CV begins to alter the operation of the dryer 14, causing the PV plot to approach the SP plot. Towards the right-hand end of FIG. 6, it will be seen that the operation of the CV has brought the PV and SP plots into essentially full convergence, meaning that appropriately dried products are now being produced. The control assembly 20 then will maintain this operational mode until some sort of upset occurs. For example, if the extruder 12 produces a wetter product, such information will be sent to controller 38 and the heater 32 will operate to provide additional heat to dry the wetter product. At the same time the successive calculation of SP and PV being fed into a PID loop govern the operation of the heater 32, as previously explained.

While the foregoing Example describes the implementation of the present invention in the context of a horizontal, single-pass, fuel-fired dryer 14 having an open-flame heater or firebox 32, with a single combustion air blower 30, a single exhaust fan 22, and a single temperature sensor 37, the invention is not so limited. For example, multiple-pass horizontal dryers could also be used having two or more vertically stacked conveyors. In such a case, the multiple conveyors would each be divided into N data elements (such as 100 data elements per conveyor) and the total number of data elements would be stored in memory, to obtain the average net rate of water removal from the dryer.

Further, the dryer could be steam-fired where a bank of steam-fed finned coils is used in lieu of the heater or firebox 32, and a plurality of recirculation fans, such as the fans 56, 58, circulate ambient-derived drying air through the steam-heated coils to heat the drying air for drying of the initially wet product. Likewise, depending upon the size of the dryer, a plurality of combustion air blowers and/or exhaust fans can be used. Normally, in such a case, each of the exhaust fans would be equipped with one or more fan parameter sensors (e.g., rpm and fan motor power), multiple temperature sensors 37 would be used, and the PLC would leverage the resultant data from the sensors to give SP and PV values during the course of product drying.

The invention can also be used with vertical, multiple-deck dryers or coolers. In the latter case, there would of course be no heated drying air, but instead ambient air would be circulated through the cooler to bring down the temperature of the product and remove moisture therefrom. In essence, the invention may be used with any product moisture-removal apparatus, so long as the apparatus makes use of an exhaust fan with one or more sensors for determining at least one fan operational parameter.

While the foregoing example sets forth a series of calculations to determine the average net rate of water removal from the incoming wet product in real time, it will be appreciated that other calculations could be used towards the same end. Although the use of a PLC with a PID controller is preferred, it will be appreciated that other types of digital controllers may be employed, e.g., a personal computer. Similarly, although the invention has been exemplified through the use of hardware inputs and outputs between the various sensors and the PLC, standard wireless communication protocols (e.g., Ethernet IP, Modbus TCP/IP) could also be utilized. Although the use of an extruder 12 is preferred, it should be understood that any suitable upstream processing unit (e.g., a pellet mill) could be employed, so long as it is capable of delivering a stream of wet product to be dried, with known Wet Rate and % H2O values.

We claim:

1. A method of controlling the operation of apparatus operable to remove water from initially wet product passing through the apparatus by contacting the wet product with input air to create dried product and moisture-laden exit air, said method comprising the steps of employing an exhaust fan to exhaust said exit air from the apparatus, determining the volumetric flow rate of said exit air from said exhaust fan, and using said volumetric flow rate to determine the net rate of water removal from said wet product during operation of said apparatus, said step of determining the net rate of water removal from said wet product including the steps of: (1) determining the rate of water leaving the apparatus as a part of the exit air from said exhaust fan; (2) subtracting from rate (1) the rate of water entering the apparatus as a part of the input air, and as a part of said initially wet product to obtain the net rate of water removal from said wet product, and adjusting at least one control parameter of the apparatus in order to alter the rate of water removal from the wet product in response to the determined net rate of water removal therefrom, said control parameter selected from the group consisting of the temperature of said input air, the speed of said wet product passing through the apparatus, the contact time between the wet product passing through the apparatus and said input air, and combinations thereof.

2. The method of claim 1, including the step of heating a portion of said input air.

3. The method of claim 2, including the step of calculating said volumetric flow rate using said fan parameter in a Fan Law equation.

4. The method of claim 1, including the step of determining at least one parameter of said exhaust fan, said fan parameter selected from the group consisting of fan motor power, fan rotational speed, and fan pressure, and combinations thereof, and using said at least one parameter to determine said volumetric flow rate.

5. The method of claim 4, including the step of determining two operational parameters of said exhaust fan selected from the group consisting of: (1) fan motor power and fan rotational speed; (2) fan pressure and fan rotational speed; or (3) fan motor power and fan pressure.

6. The method of claim 5, including the steps of:
(a) determining the wet bulb temperature and dry bulb temperature of said exit air;
(b) determining the rotational speed of said exhaust fan;
(c) determining the motor power of said exhaust fan;
(d) determining the wet bulb temperature and dry bulb temperature of said input air; and
(e) determining said net rate of water removal from said wet product in real time as the wet product passes through said drying chamber, using the determined values (a)-(d), inclusive.

7. The method of claim 1, including the steps of determining a set point rate SP which is the desired net rate of water removal from the wet product during passage thereof through the apparatus, determining a process variable PV which is the actual net rate of water exiting the wet product during passage through the apparatus, and controlling the operation of the apparatus using said SP and said PV, to cause said PV to approach said SP.

8. The method of claim 7, including the steps of successively and periodically determining said SP and said PV, and controlling the operation of the apparatus using said successive SP and PV determinations.

9. The method of claim 8, including the step of using a PLC controller with a PID controller to carry out said successive determinations of said SP and said PV.

10. The method of claim 9, said PLC controller operable, in each of said successive determinations, to calculate said SP, said PV, the difference between said SP and said PV, and a control variable CV.

11. The method of claim 7, including the step of determining said SP as the initial water rate (IWR) minus the final water rate (FWR), where IWR is the rate of water delivered to the apparatus as a part of said wet product input, and FWR is the desired rate of water exiting from the apparatus as a part of said dried product.

12. The method of claim 7, including the step of determining said PV as the rate of water leaving said apparatus as a part of the output of said exhaust fan minus the rate of water entering said apparatus as a part of said input air.

13. The method of claim 1, including the step of determining the net rate of water removal from said wet product in real time as the product passes through the apparatus.

14. The method of claim 13, said net rate of water removal being an average net rate of water removal.

15. A method of controlling the operation of apparatus operable to remove water from initially wet product passing through the apparatus by contacting the wet product with input air to create dried product and moisture-laden exit air, said method comprising the steps of employing an exhaust fan to exhaust said exit air from the apparatus, and determining the net rate of water removal from said wet product in real time during operation of said apparatus, said step of determining the net rate of water removal from said wet product including the steps of: (1) determining the rate of water leaving the apparatus as a part of the exit air from said exhaust fan; (2) subtracting from rate (1) the rate of water entering the apparatus as a part of the input air, and as a part of said initially wet product to obtain the net rate of water removal from said wet product, and adjusting at least one control parameter of the apparatus in order to alter the rate of water removal from the wet product in response to the determined net rate of water removal therefrom, said control parameter selected from the group consisting of the temperature of said input air, the speed of said wet product passing through the apparatus, the contact time between the wet product passing through the apparatus and said input air, and combinations thereof.

16. The method of claim 15, including the step of heating a portion of said input air.

17. The method of claim 15, including the step of determining at least one fan parameter of said exhaust fan selected from the group consisting of fan motor power, fan rotational speed, and fan pressure, and combinations thereof, and using said at least one parameter to determine said volumetric flow rate.

18. The method of claim 17, including the step of determining two operational parameters of said exhaust fan selected from the group consisting of: (1) fan motor power and fan rotational speed; (2) fan pressure and fan rotational speed; or (3) fan motor power and fan pressure.

19. The method of claim 18, including the steps of:
(a) determining the wet bulb temperature and dry bulb temperature of said exit air;
(b) determining the rotational speed of said exhaust fan;
(c) determining the motor power of said exhaust fan;
(d) determining the wet bulb temperature and dry bulb temperature of said input air; and
(e) determining said net rate of water removal from said wet product in real time as the wet product passes through said drying chamber, using the determined values (a)-(d), inclusive.

* * * * *